(12) United States Patent
Werner et al.

(10) Patent No.: US 6,913,870 B2
(45) Date of Patent: Jul. 5, 2005

(54) FABRICATION PROCESS USING A THIN LIFTOFF STENCIL FORMED BY AN IMAGE TRANSFER PROCESS

(75) Inventors: Douglas Johnson Werner, Fremont, CA (US); Alfred Floyd Renaldo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 10/143,688

(22) Filed: May 10, 2002

(65) Prior Publication Data

US 2003/0211424 A1 Nov. 13, 2003

(51) Int. Cl.[7] .............................................. G03F 7/00
(52) U.S. Cl. ....................................................... 430/311
(58) Field of Search ......................................... 430/311

(56) References Cited

U.S. PATENT DOCUMENTS

| | | | |
|---|---|---|---|
| 4,519,872 A | * 5/1985 | Anderson et al. | 438/623 |
| 5,665,251 A | 9/1997 | Robertson et al. | 216/22 |
| 6,001,734 A | 12/1999 | Dryann | 438/637 |
| 6,162,587 A | 12/2000 | Yang et al. | 430/314 |
| 6,184,142 B1 | 2/2001 | Chung et al. | 438/692 |
| 6,194,323 B1 | 2/2001 | Downey et al. | 438/717 |
| 6,211,044 B1 | 4/2001 | Xiang et al. | 438/585 |

FOREIGN PATENT DOCUMENTS

| | | | |
|---|---|---|---|
| GB | 2331273 A | 5/1999 | G22B/5/39 |
| JP | 57093526 A | 6/1982 | H01L/21/30 |
| JP | 2207418 A | 8/1990 | H01L/13/00 |
| JP | 2000252259 | 9/2000 | H01L/21/3065 |

* cited by examiner

*Primary Examiner*—Amanda Walke
(74) *Attorney, Agent, or Firm*—Zilka-Kotab, PC; Dominic M. Kotab

(57) ABSTRACT

A material is deposited on a substrate by depositing a liftoff layer overlying the substrate, thereafter depositing a hard-mask layer overlying the liftoff layer, thereafter depositing an image layer in registry with a retained portion of the hard-mask layer, leaving a nonretained portion of the hard-mask layer which is not in registry with the image layer. The method further includes removing the nonretained portion of the hard-mask layer, removing at least a part of the thickness of the image layer, and removing a nonretained portion of the liftoff layer, which may include an undercut under the hard-mask layer. The deposited material is deposited onto the substrate from a source, and the retained portion of the hard-mask layer and any part of the liftoff layer remaining between the hard-mask layer and the substrate is thereafter removed.

20 Claims, 5 Drawing Sheets

FABRICATION PROCESS USING A THIN LIFTOFF STENCIL FORMED BY AN IMAGE TRANSFER PROCESS

This invention relates to the fabrication of fine-scale features and, more particularly, to the deposition of features with sharply defined profiles in magnetoresistance sensors.

BACKGROUND OF THE INVENTION

A magnetoresistance (MR) sensor is used in a read/write head to read magnetic fields on a recording medium of a magnetic storage device. An example is the read/write head of a computer hard disk drive or a magnetic recording tape drive. The read/write head is positioned closely adjacent to the recording medium, separated from the recording medium by an air bearing. A data bit is written onto an area, usually a track, of the recording medium using the writing portion of the read/write head by locally changing its magnetic state. That magnetic state is later sensed by the MR sensor to read the data bit.

A continuing trend is to decrease the size of the sensing area of the MR sensor, which permits an associated decrease in the track width on the magnetic recording medium. As a result, the number of tracks and the density of data storage on the recording medium are increased. As the size of the sensing area is reduced, the fabrication of the small-scale structures to have the required spatial sizes and sharp edge definitions becomes more difficult. These difficulties are related in part to the physical limits of photolithography and other techniques used in the fabrication processes. In some parts of the fabrication processing, the limits are being reached so that further decreases in the size of the feature result in a loss of edge definition that adversely affects the magnetic sensing functionality.

There is a need for an improved approach to the fabrication of fine features in MR sensors and other structures. The present invention fulfills this need, and further provides related advantages.

SUMMARY OF THE INVENTION

The present invention provides a process employed in the fabrication of fine-scale features on a substrate. It is particularly useful in fabricating micromagnetic and microelectronic devices. In an application of particular interest, the magnetoresistance sensor of a read/write head is fabricated using the present approach. The resolution and fine-scale edge definition of the processing are improved, allowing a further reduction in the size of the fabricated device.

In accordance with the invention, a method for fabricating a feature including the deposition of a deposited material comprises the steps of furnishing a substrate, thereafter depositing a liftoff layer overlying the substrate, thereafter depositing a hard-mask layer overlying the liftoff layer, and thereafter depositing an image layer in registry with a retained portion of the hard-mask layer, leaving a nonretained portion of the hard-mask layer which is not in registry with the image layer. The method further includes removing the nonretained portion of the hard-mask layer, removing at least a part of the thickness of the image layer, removing a nonretained portion of the liftoff layer, thereafter depositing the deposited material onto the substrate from a source, and thereafter removing the retained portion of the hard-mask layer and any part of the liftoff layer remaining between the hard-mask layer and the substrate. This last removal is preferably accomplished by dissolving the liftoff layer. In some embodiments, an etching (ion milling) step may also be performed prior to the deposition of the deposited-material layer.

The substrate desirably comprises a part of a magnetic read/write head, particularly a part of a magnetoresistance (MR) sensor structure.

It is preferred that the removing of the nonretained portion of the liftoff layer includes the steps of removing a portion of the liftoff layer that does not lie in registry with the retained portion of the hard-mask layer, and removing an undercut portion of the liftoff layer that lies in registry with the retained portion of the hard-mask layer. The removing of an undercut portion of the liftoff layer may include removing less than all of the liftoff layer that lies in registry with the retained portion of the hard-mask layer, as by removing an edge portion of the liftoff layer that lies adjacent to an edge of the retained portion of the hard-mask layer. In the limit, the step of removing an undercut portion of the liftoff layer includes the step of removing substantially all of the liftoff layer that lies in registry with the retained portion of the hard-mask layer in the narrow track area.

Desirably, the image layer is formed by depositing a layer of an image layer photoresist material overlying the hard-mask layer, and patterning and developing the layer of the image layer photoresist material. The deposited material is deposited onto the substrate from a source that produces a beam of the deposited material.

The hard-mask layer is a material that retains its masking ability in the deposition step, and is accordingly relatively hard and durable. A preferred hard-mask material is tantalum or tantalum oxide. The thickness of the hard-mask layer is sufficient to retain the masking ability but desirably no thicker than required to perform this function. The hard-mask layer is typically tantalum, tantalum oxide, silicon nitride, or silicon dioxide in a thickness of from about 50 to about 150 nm (nanometers).

In an embodiment of the present approach, a method for fabricating a feature including the deposition of a deposited material comprises the steps of furnishing a substrate comprising a magnetoresistance sensor structure having a sensing area, thereafter depositing a liftoff layer of an organic liftoff layer material overlying the magnetoresistance sensor structure, thereafter depositing a hard-mask layer of a nonorganic hard mask material overlying the magnetoresistance sensor structure, and thereafter depositing by photolithography an image layer of an organic photoresist material in registry with the sensing area and overlying the sensing area. The method further includes reactive ion etching in a fluorine-containing atmosphere to remove that portion of the hard-mask layer which is not overlaid by the image layer, reactive ion etching in an oxygen-containing atmosphere to remove the image layer, undercutting the hard-mask layer by removing some or all of the liftoff layer that underlies the hard mask layer and overlies the sensor area, and depositing the deposited material onto the substrate from a source that produces a beam of the deposited material. The thickness of the hard-mask layer is sufficient that it is not removed during the step of depositing the deposited material. Lastly, the remaining organic liftoff layer material is dissolved.

In the present approach, the hard-mask layer, not the image layer, is used as the mask during the deposition step. The image layer is made of a relatively soft organic material. The image layer is relatively thick (typically 300–700 nm) to serve its photolithographic function. If the image layer were thence to be used as the mask during deposition, it would necessarily be thick and result in edge profiles that are not sharp and/or are coarsely spaced. In the present approach, the hard-mask layer is relatively hard and may therefore be made quite thin. The result is edges that are more sharply defined and may be made more finely spaced. Additionally, the depth of an undercut of the liftoff layer may be independently controlled.

In an application of interest, the deposited-material layer is a layered structure at the surface of the MR sensor. The deposited material serves as both an external electrical contact and as a magnetic stabilizer of the MR sensor, and attaining a sharp vertical edge profile results in improved performance in at least two ways. First, the deposited-material layer includes a "hard bias" magnetic-material sublayer such as CoPtCr, followed by a sublayer of a conductive lead metal, such as Ta or Rh. The thickness of the hard-bias magnetic material in the area immediately adjacent to the sensor (i.e., less than about 1 micrometer) must be well controlled. When it is too thin, it does not provide sufficient magnetic moment to adequately stabilize the sensor. When it is too thick, it supplies too much magnetic moment, reducing the sensor amplitude by "deadening" the sensor in the overstabilized end regions. When the edges of the magnetic sublayer are greatly tapered, the uniformity of its thickness in the areas immediately adjacent to the sensor (i.e., the tapered areas) across a wafer is relatively poor. Sharper edge profiles result in a more-uniform thickness adjacent to the sensor, producing better distributions of head amplitude and stability. Second, it is desired to minimize the total thickness of the built-up layers so that subsequent layer processing is done on a more-nearly-planar surface. The thickness of the deposited magnetic-material sublayer may be reduced if that thickness is nearly constant as it approaches the sensor edge, inasmuch as the magnetic moment experienced by the sensor is determined by the thickness of the magnetic-material sublayer in close proximity to it. Therefore, the total film thickness requirement is reduced when sharper edge profiles are produced, as in the present approach.

The present approach thus improves the ability to fabricate structures with fine-scale, sharply defined features. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
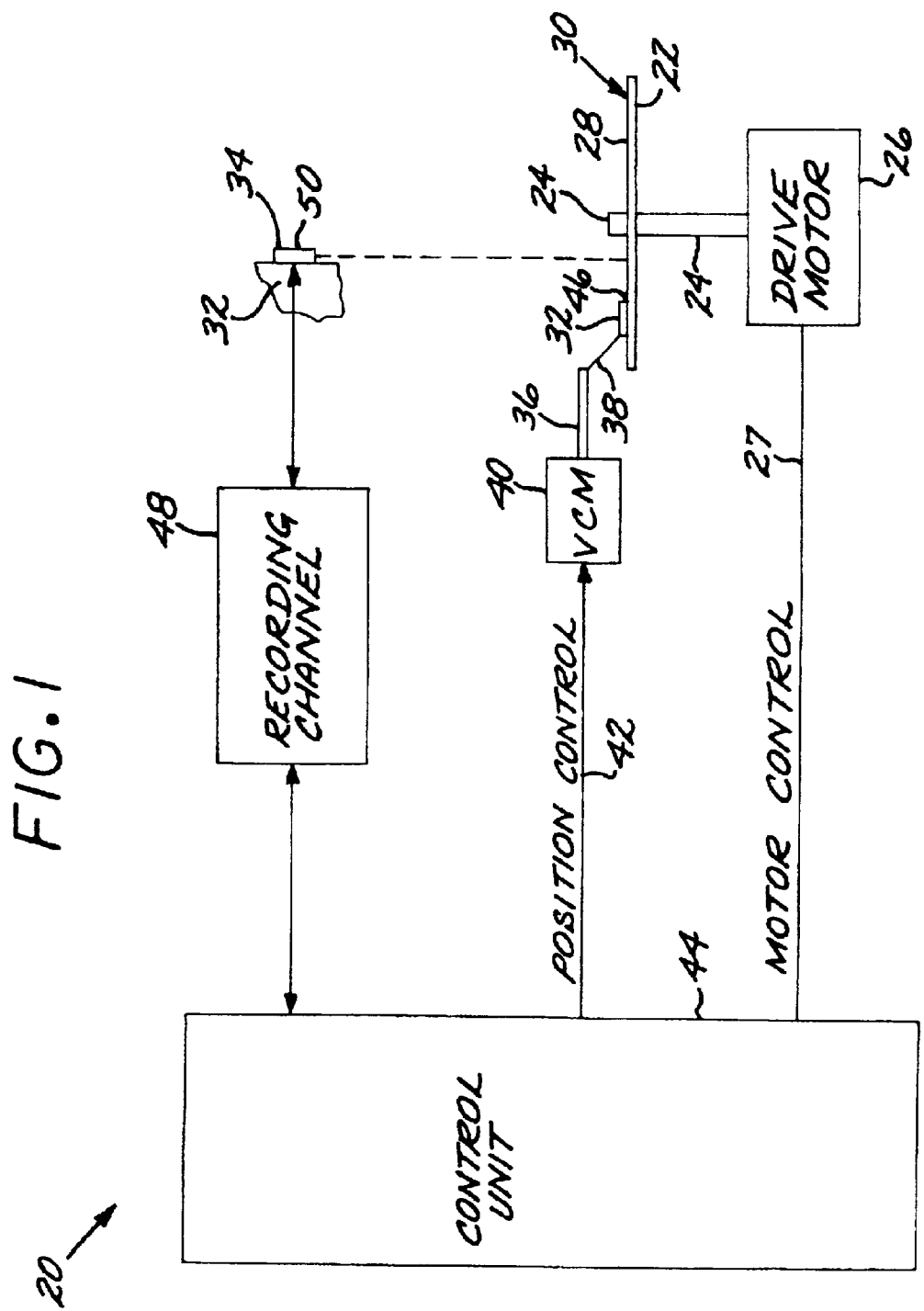
FIG. 1 is a schematic diagram of a magnetic disk data storage system.

FIG. 1 shows a data storage system, here depicted as a magnetic disk drive system 20, with which the present approach may be used. The magnetic disk drive system 20 includes a rotatable magnetic storage disk 22 that is supported on a spindle 24 and rotated by a disk drive motor 26 under motor control 27 of a control unit 44. A magnetic storage medium 28 is deposited on a surface 30 of the magnetic storage disk 22.

A slider 32 is positioned in facing relation to the magnetic storage disk 22. The slider 32 supports at least one read/write head 34 in facing relation to the magnetic storage medium 28 of the magnetic storage disk 22. The slider 32 is mounted to an actuator arm 36 by a suspension 38. The actuator arm 36 and the slider 32 move radially inwardly and outwardly so that the combined inward/outward motion of the slider 32 and the rotation of the magnetic storage disk 22 allows the read/write head 34 to be placed into facing relation to the entire area of the magnetic storage medium 28. The actuator arm 36 is driven by an actuator 40 (depicted as a voice coil motor or VCM) under the radial position control 42 of the control unit 44.

The suspension 38 generates a slight spring force which biases the slider 32 toward the surface 30 of the magnetic storage disk 22. During sensor operation the magnetic storage disk 22 turns, and an air bearing is created between the downwardly facing surface of the slider 32, termed the air bearing surface 46 or ABS, and the upwardly facing surface 30 of the magnetic storage disk 22. (Only the downwardly oriented slider is illustrated, but there may also or instead be an upwardly oriented slider facing the bottom side of the magnetic storage disk.) The air bearing counterbalances the slight spring force of the suspension 38 and supports the slider 32 a small distance above the surface 30 with a small, substantially constant separation.

The read/write head 34 writes data onto the magnetic storage medium 28 by altering magnetic states in the magnetic storage medium 28, and also reads data from the magnetic storage medium 28 by sensing the magnetic states in the magnetic storage medium 28. The writing and reading commands, as well as the data to be written or read, is transmitted between the control unit 44 and the read/write head 34 over a recording channel 48.

The present approach is concerned with a fabrication processing used in preparing a magnetoresistance (MR) sensor structure 50 that is part of the read/write head 34. Two known types of MR sensors are a giant magnetoresistance (GMR) sensor and a tunnel magnetoresistance (TMR) sensor. The general technical basis, construction, and operation of the GMR sensor are described, for example, in U.S. Pat. No. 5,436,778. The general technical basis, construction, and operation of the TMR sensor are described, for example, in U.S. Pat. No. 5,729,410. The disclosures of both patents are incorporated by reference in their entireties. These patents also describe the read/write heads and the magnetic storage systems.

The preceding discussion is a simplified description of the data storage system in the form of the magnetic disk drive system 20, to set the environment in which the present invention is preferably used. The present invention is also applicable to other types of magnetic data storage systems such as tape drives and their read/write heads.

Figure 2:
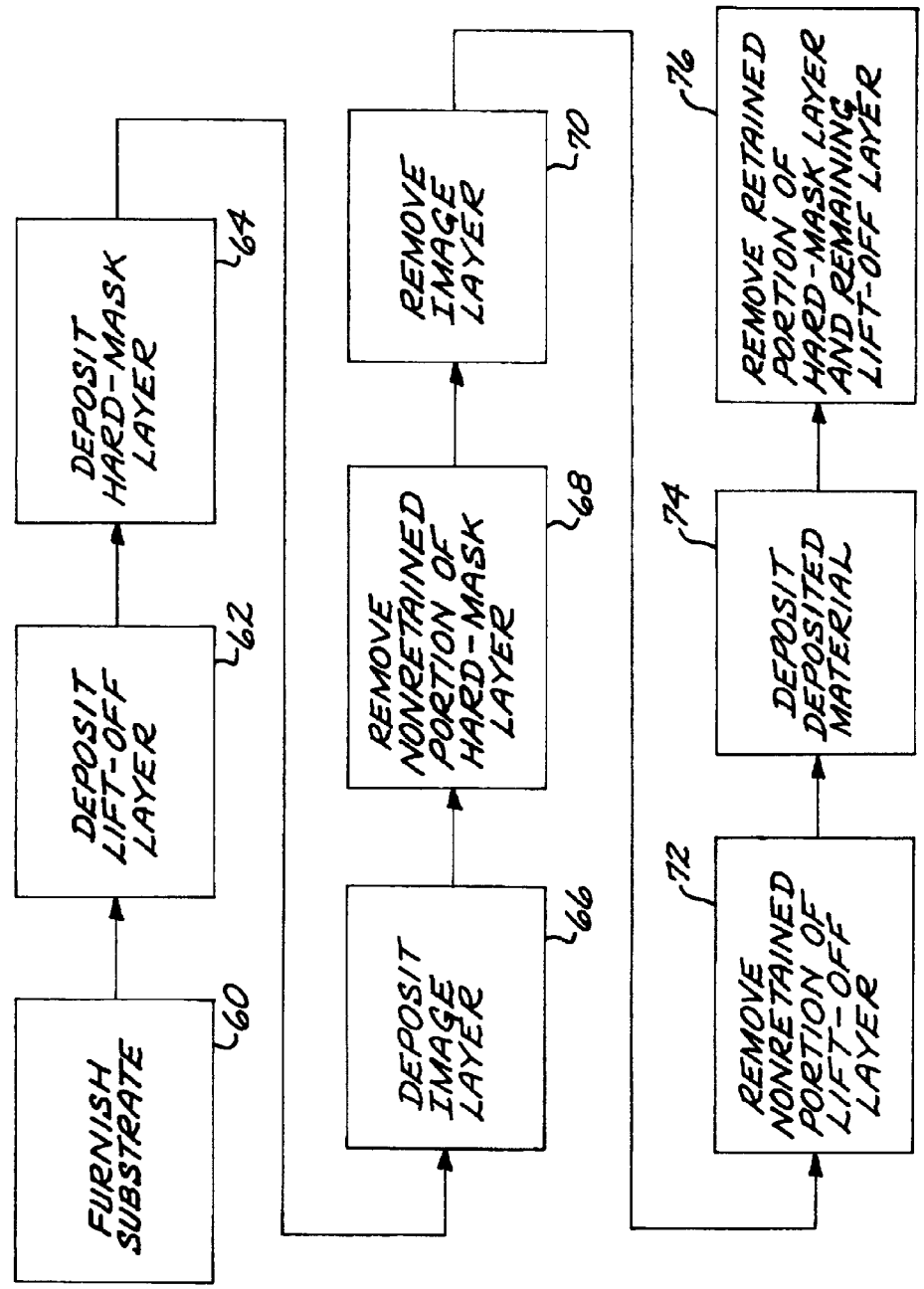
FIG. 2 is a block flow diagram of a method for fabricating an MR sensor structure.

FIG. 2 shows in block diagram form a method for fabricating the MR sensor structure 50, and FIGS. 3–8 schematically depict one form of the MR sensor structure 50 at various stages of fabrication processing illustrated in FIG. 2. FIGS. 3–8, and FIG. 9, are not drawn to scale.

Figure 3:
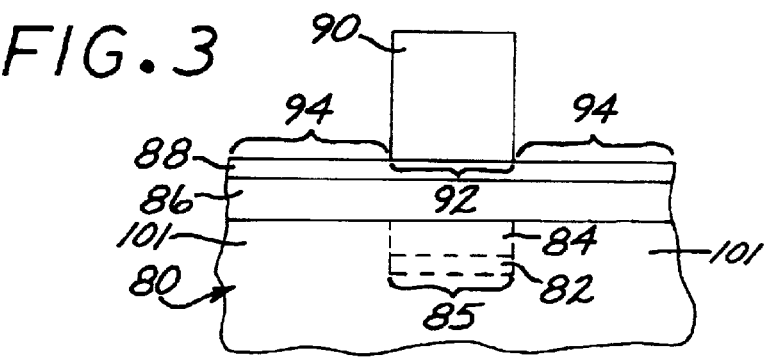
FIGS. 3–8 are schematic sectional views of the MR sensor structure at stages of the fabrication method depicted in FIG. 2.

A substrate 80 is furnished, numeral 60 of FIG. 2. The substrate 80, shown in FIG. 3, may be any substrate that is to have material deposited thereon. In a preferred application, the substrate 80 is the lower portion of the MR sensor structure 50, and in particularly is illustrated as the lower portion of the GMR sensor. The "lower portion"

includes the layers underlying a free layer 82 and a cap layer 84 shown in FIG. 3. Generally, the structure of the GMR sensor includes two thin-film stacks separated by an intermediate nonmagnetic film, typically a copper film, serving as a spacer layer. The lower thin-film includes a magnetic pinning structure, and the upper thin-film stack includes the free layer 82 that responds to an external magnetic field. A magnetic biasing structure is present, preferably in the form of a contiguous junction positioned laterally adjacent to the two thin-film stacks and the spacer layer. The free layer 82 defines a sensing area 85 of the MR sensor structure 50. The structure of the GMR sensor is well known in the art, other than the features set forth herein, and is described, for example, in the '778 patent. Leads are to be deposited upon the substrate 80 by the approach described herein.

A lift-off layer 86, shown in FIG. 3, is deposited upon the substrate 80, numeral 62 of FIG. 2. The lift-off layer 86 is preferably an organic material similar to a photoresist material but not photoactive. An example of the material used in the lift-off layer is polydimethyglutarimide (PMGI). The lift-off layer 86 is deposited by any operable approach, but is preferably deposited by spin-on processing to a thickness of from about 10 to about 100 nm.

A hard-mask layer 88, shown in FIG. 3, is deposited upon the liftoff layer 86, numeral 64 of FIG. 2. The hard-mask layer 88 is preferably a nonorganic metal or ceramic that is relatively hard and resistant to etching or other removal during the deposition process to be described subsequently. Examples of preferred hard-mask materials include tantalum, tantalum oxide, silicon nitride, or silicon dioxide. The hard-mask layer 88 is applied by any operable approach for the material selected. Preferably, the hard-mask layer 88 is applied by sputtering or ion beam deposition to a thickness of from about 50 nm to about 150 nm.

An image layer 90 is deposited upon the hard-mask layer 88, numeral 66 of FIG. 2. The image layer 90 is patterned, as shown in FIG. 3, so that it lies in registry with and overlying a retained portion 92 of the hard-mask layer 88, and so that there is left a nonretained portion 94 of the hard-mask layer 88 which is not in registry with the image layer 90. The retained portion 92 is so termed because it will not be removed in the next removal step in which the nonretained portion 94 is removed. In the preferred application, the retained portion 92 of the hard-mask layer 88 is positioned to overlie the sensing area 85. The image layer 90 is preferably an organic photoresist material, such as a novolak-based I-line sensitized resin or a polyvinyl phenol deep-UV-sensitized resin, which is applied by spinning, exposed, and developed in the usual manner to leave the image layer 90 overlying the retained portion 94 and leave the nonretained portion 94 not covered by the image layer 90, as seen in FIG. 3. The image layer 90 will be removed in a subsequent step, and its thickness is not critical.

Figure 4:
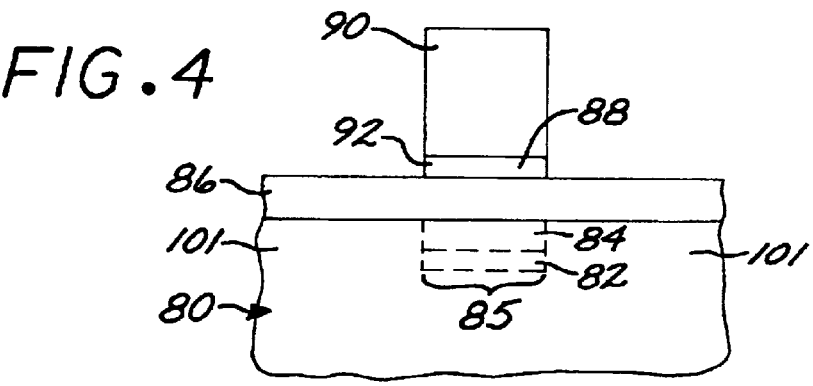

The nonretained portion 94 of the hard-mask layer 88 is removed, numeral 68 of FIG. 2, producing the structure shown in FIG. 4. The retained portion 92 of the hard-mask layer 88, which underlies the image layer 90, remains. The nonretained portion 94 of the hard-mask layer 88 is removed by any operable technique. The nonretained portion 94 is preferably removed by reactive ion etching in a fluorine-containing atmosphere. The organic lift-off layer 86 is not strongly attacked by reactive ion etching in a fluorine-containing atmosphere, slowing down the etching sufficiently that the fluorine-containing atmosphere does not attack the underlying substrate 80.

Figure 5:
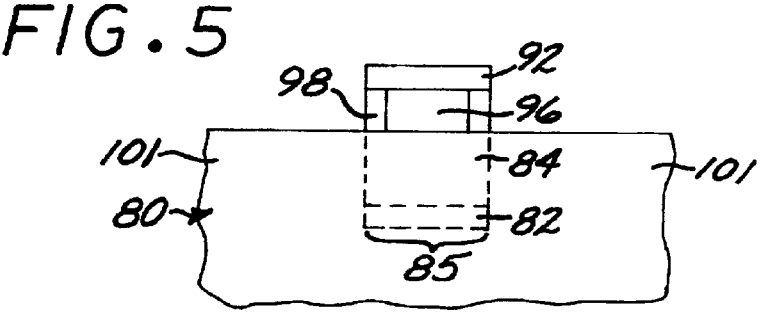

At least a part, and preferably all, of the thickness of the organic image layer 90 is removed, numeral 70 of FIG. 2, producing the structure shown in FIG. 5. The removal step 70 is preferably accomplished by reactive ion etching in an oxygen-containing (e.g., oxygen or carbon monoxide) atmosphere. This removal step 70 also typically removes some of the organic lift-off layer 86, particularly that portion of the organic lift-off layer 86 that does not lie under the retained portion 92 of the hard-mask layer 88. That is, there typically remains a retained portion 96 of the lift-off layer 86 underlying the retained portion 92 of the hard-mask layer 88, although there may be some removal of the lift-off layer 86 underlying the edges of the hard-mask layer 88. The reactive ion etching in an oxygen-containing atmosphere does not significantly attack the hard-mask layer 88 or the exposed surface of the substrate 80, which act as stops.

Figure 6:
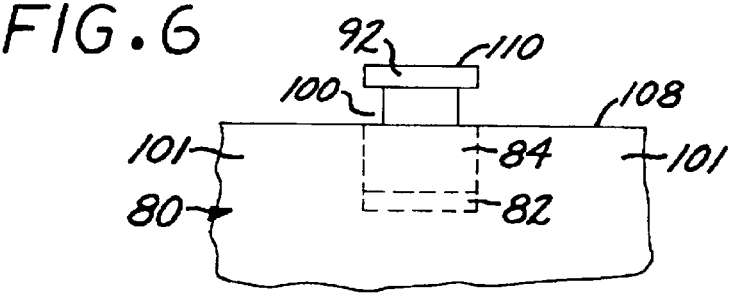

A nonretained portion 98 of the lift-off layer 86 is optionally removed, numeral 72, to produce the structure shown in FIG. 6. (In FIG. 5, the nonretained portion 98 is still present, but is identified and called out so that its location may be seen for comparison with the structure of FIG. 6.) The nonretained portion 98 is a portion of the lift-off layer 86 that underlies the retained portion 92 of the hard-mask layer 88, typically at its edges. Its removal produces an undercut portion 100 in the plane of the lift-off layer 86. The extent of the undercut portion 100 may be selected as desired. There may be a relatively shallow undercut portion 100 as illustrated in FIG. 6, there may be a deeper undercut portion, or the undercut portion may extend beneath the entire retained portion 92 of the hard-mask layer 88. In the latter case, the retained portion 92 of the hard-mask layer is self-supporting upon structure that is out of the plane of the illustration of FIG. 6. The removal step 72 may be readily accomplished by a wet dissolution of the nonretained portion 98 in a liquid that is a solvent for the organic material of the retained portion 96 of the lift-off layer. The resulting structure illustrated in FIG. 6 constitutes a mask, defined by the retained portion 92 of the hard-mask layer 88, suspended above the substrate 80.

The removal steps 70 and 72 may be conducted sequentially or simultaneously, or it may not be necessary to perform step 72, depending upon how much of the lift-off layer 86 is removed during the removal step 70 and how deep is the desired undercut portion 100. If the undercut portion 100 is very shallow or step 70 is performed by a dissolution technique, sufficient lift-off material may be removed in step 70, and it is not necessary to perform step 72. The interrelation of steps 70 and 72 may be adjusted as necessary dependent upon these considerations.

Optionally, at any time after step 60 and prior to the next step 74, lateral portions 101 of the substrate 80, which is laterally adjacent to the indicated as-deposited portions of the layers 82 and 84 and other underlying structure of the as-furnished MR sensor structure as well, may be removed to define the width of the sensing area 85 and thence define the plan-view shape of the final MR sensor structure. That is, the lateral portion 101 of the substrate 80 (which comprises the magnetoresistance sensor structure) spaced laterally from the sensing area 85 may be removed. This removal of the lateral portion 101 may be accomplished by any operable technique, with ion milling being preferred.

Figure 7:
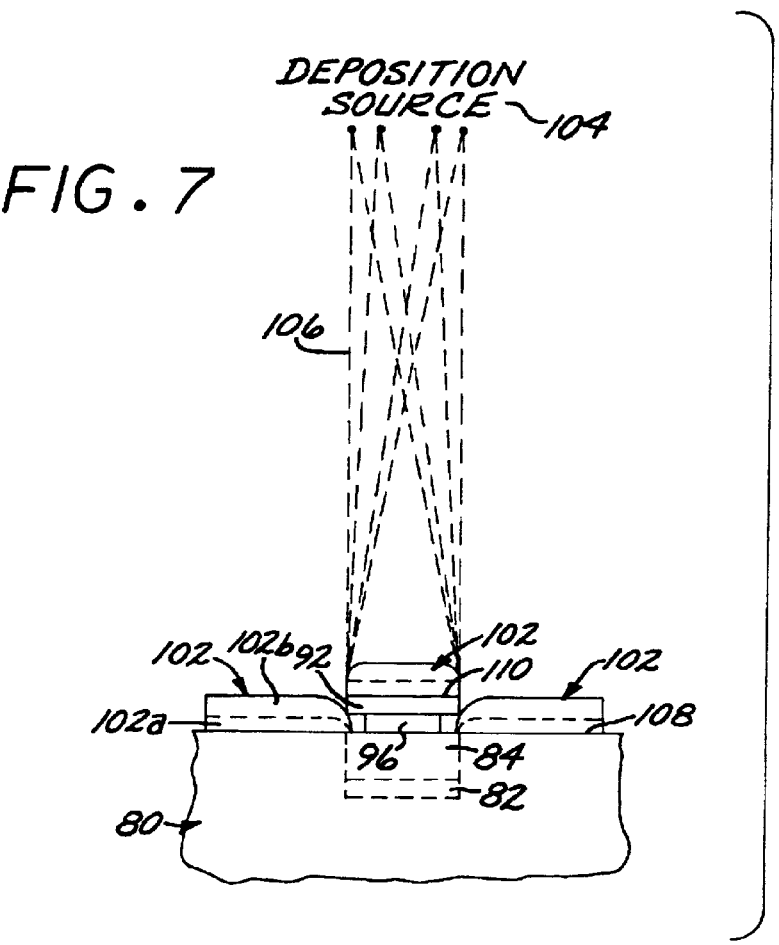

A deposited-material layer 102 of the deposited material is deposited, numeral 74 of FIG. 2, onto the substrate 80 from a deposition source 104, as illustrated in FIG. 7. The source 104 desirably produces a beam 106 of the deposited material that is directed toward the masked substrate of FIG. 6. Part of the deposited-material layer 102 resides on an upper surface 108 of the substrate 80, and part of the deposited-material layer 102 resides on an upper surface 110 of the retained portion 92 of the hard-mask layer 88. The deposition source 104 may be of any operable type for the material serving as the deposited material. In a preferred case where the portion of the deposited-material layer 102 that resides on the upper surface 108 of the substrate 80 and serves in the final structure as leads to the MR sensor structure 50, the deposited-material layer 102 is a two-layer structure. The first sublayer 102a is a CoPtCr sublayer in a thickness of from about 10 nm to about 30 nm, and an overlying second sublayer 102b is a rhenium or tantalum sublayer in a thickness of from about 20 nm to about 80 nm.

Figure 8:
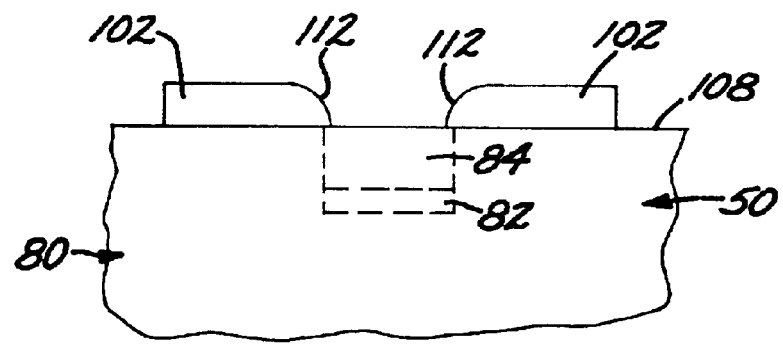

After the deposition step 74 is complete, the mask structure is removed by removing the retained portion 92 of the hard-mask layer 88 and any part of the retained portion 96 of the liftoff layer remaining between the retained portion 92 of the hard-mask layer and the substrate 80, numeral 76 of FIG. 2, to produce the structure illustrated in FIG. 8. In this process, the portion of the deposited-material layer 102 that lies on the upper surface 110 of the retained portion 92 of the hard-mask layer 88 is also removed. In the illustrated embodiment, the retained portion 96 of the lift-off layer 86 is removed. The removal is preferably accomplished by immersing the structure resulting from the deposition step 74 into a solvent for the organic material of the lift-off layer 86, so that the lift-off layer 86 dissolves and the retained portion 92 and the deposited material 102 on the upper surface 110 of the retained portion 92 are released and separated from the substrate 80.

Figure 9:
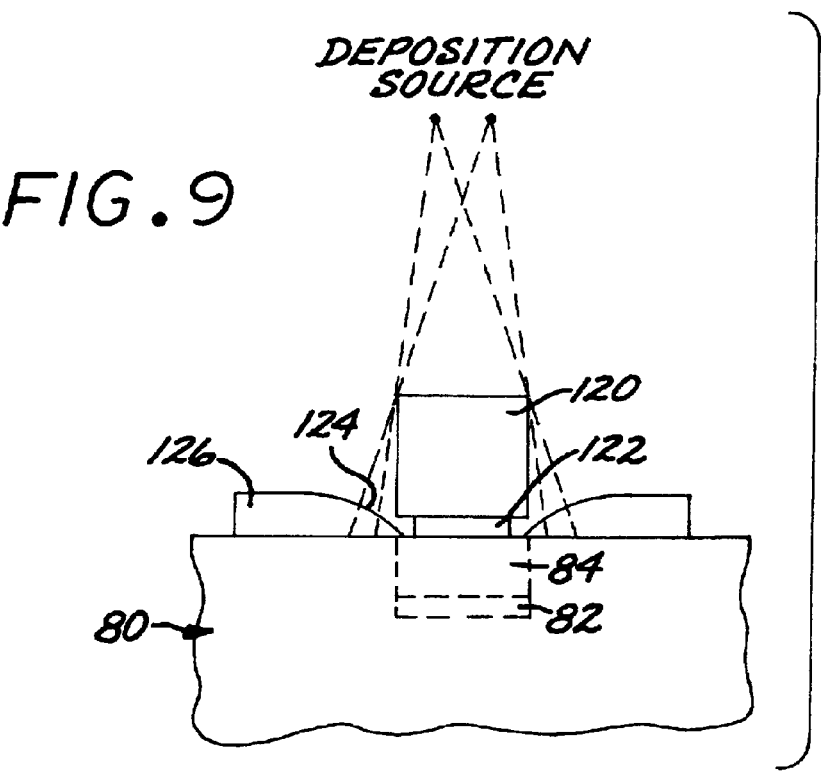
FIG. 9 is a schematic sectional view of an approach for fabricating the MR sensor which is not within the scope of the invention.

The processing summarized in FIG. 2 produces the structure illustrated in FIG. 8, wherein the deposited-material layer 102 on the upper surface 108 of the substrate 80 has a relatively well defined central edge 112. That is, the central edge 112 is sharp. This sharpness results from the relatively thin mask produced by the retained portion 92 of the hard-mask layer 88. By contrast, FIG. 9 illustrates an approach that is not within the scope of the invention. In this case, the mask is a thick layer 120 of a photoresist material, and there is no hard-mask layer as in the present approach. (The layer 122 is lift-off material.) The relatively thick layer 120 is a commercially produced photoresist material. Such photoresist materials are generally only available in the range of thicknesses of about 300–700 nm. Because the mask of FIG. 9 is relatively thick and the top masking surface is further from the surface of the substrate than in the present approach, the central edge 124 of the deposited-material layer 126 is less sharply defined than is the central edge 112 produced by the present approach.

Another important advantage of the present approach of FIGS. 2–8 over that depicted in FIG. 9 is that the amount of the undercut portion 100 of the lift-off layer may be controlled precisely and somewhat independently of the removal of the image layer 90. The lateral depth of the undercut portion 100 is established in the removal of the nonretained portion of the image layer 90 in the image layer development step. The lateral depth of the undercut portion 100 is established in the removal step 72 while not affecting the thickness or width of the retained portion 92 of the hard-mask layer 88.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a feature including the deposition of a deposited material, comprising the steps of furnishing a substrate; thereafter depositing a liftoff layer overlying the substrate; thereafter depositing a hard-mask layer overlying the liftoff layer; thereafter depositing an image layer in registry with a retained portion of the hardmask layer, leaving a nonretained portion of the hard-mask layer which is not in registry with the image layer; thereafter removing the nonretained portion of the hard-mask layer;

removing at least a part of the thickness of the image layer;

removing a nonretained portion of the liftoff layer and an undercut portion of the liftoff layer that is less than all of the liftoff layer that lies in registry with the retained portion of the hard-mask layer; thereafter depositing the deposited material onto the substrate from a source; and thereafter removing the retained portion of the hard-mask layer and any part of the liftoff layer remaining between the hard-mask layer and the substrate.

2. The method of claim 1, wherein the step of removing the nonretained portion of the liftoff layer includes the steps of removing a portion of the liftoff layer that does not lie in registry with the retained portion of the hard-mask layer, and removing an undercut portion of the liftoff layer that lies in registry with the retained portion of the hard-mask layer.

3. A method for fabricating a feature including the deposition of a deposited material, comprising the steps of, furnishing a substrate; thereafter depositing a liftoff layer overlying the substrate; thereafter depositing a hard-mask layer overlying the liftoff layer; thereafter depositing an image layer in registry with a retained portion of the hardmask layer, leaving a nonretained portion of the hard-mask layer which is not in registry with the image layer; thereafter removing the nonretained portion of the hard-mask layer;

removing at least a part of the thickness of the image layer;

removing a nonretained portion of the liftoff layer including removing a portion of the liftoff layer that does not lie in registry with the retained portion of the hard-mask layer, and removing an undercut portion of the liftoff layer that lies in registry with the retained portion of the hard-mask layer; thereafter depositing the deposited material onto the substrate from a source; and thereafter removing the retained portion of the hard-mask layer and any part of the liftoff layer remaining between the hard-mask layer and the substrate;

wherein the step of removing an undercut portion of the liftoff layer includes the step of removing less than all of the liftoff layer that lies in registry with the retained portion of the hard-mask layer.

4. The method of claim 2, wherein the step of removing an undercut portion of the liftoff layer includes the step of removing an edge portion of the liftoff layer that lies adjacent to an edge of the retained portion of the hard-mask layer.

5. The method of claim 2, wherein the step of removing an undercut portion of the liftoff layer includes the step of removing substantially all of the liftoff layer that lies in registry with the retained portion of the hard-mask layer.

6. A method for fabricating a feature including the deposition of a deposited material, comprising the steps of furnishing a substrate; thereafter depositing a liftoff layer overlying the substrate; thereafter depositing a hard-mask layer overlying the liftoff layer; thereafter depositing an image layer in registry with a retained portion of the hardmask layer, leaving a nonretained portion of the hard-mask layer which is not in registry with the image layer; thereafter removing the nonretained portion of the hard-mask layer;

removing at least a part of the thickness of the image layer;

removing a nonretained portion of the liftoff layer; thereafter depositing the deposited material onto the substrate from a source; and thereafter removing the retained portion of the hard-mask layer and any part of the liftoff layer remaining between the hard-mask layer and the substrate;

wherein the step of furnishing a substrate includes the step of furnishing a substrate comprising a part of a magnetic read/write head.

7. A method for fabricating a feature including the deposition of a deposited material, comprising the steps of furnishing a substrate; thereafter depositing a liftoff layer overlying the substrate; thereafter depositing a hard-mask layer overlying the liftoff layer; thereafter depositing an image layer in registry with a retained portion of the hardmask layer, leaving a nonretained portion of the hard-mask layer which is not in registry with the image layer; thereafter removing the nonretained portion of the hard-mask layer;

removing at least a part of the thickness of the image layer;

removing a nonretained portion of the liftoff layer; thereafter depositing the deposited material onto the substrate from a source; and thereafter removing the retained portion of the hard-mask layer and any part of the liftoff layer remaining between the hard-mask layer and the substrate;

wherein the step of furnishing a substrate includes the step of furnishing a substrate comprising a part of a magnetoresistance sensor structure.

8. The method of claim 1, wherein the step of depositing an image layer includes the steps of depositing a layer of an image layer photoresist material overlying the hard-mask layer, and patterning and developing the layer of the image layer photoresist material.

9. The method of claim 1, wherein the step of depositing the deposited material includes the step of depositing the deposited material onto the substrate from a source that produces a beam of the deposited material.

10. The method of claim 1, wherein the step of depositing the hardmask layer includes the step of depositing a hard-mask layer having a thickness of from about 50 nm to about 150 nm.

11. A method for fabricating a feature including the deposition of a deposited material, comprising the steps of furnishing a substrate; thereafter depositing a liftoff layer overlying the substrate; thereafter depositing a hard-mask layer overlying the liftoff layer; thereafter depositing an image layer in registry with a retained portion of the hardmask layer, leaving a nonretained portion of the hard-mask layer which is not in registry with the image layer; thereafter removing the nonretained portion of the hard-mask layer;

removing at least a part of the thickness of the image layer;

removing a nonretained portion of the liftoff layer; thereafter depositing the deposited material onto the substrate from a source; and thereafter removing the retained portion of the hard-mask layer and any part of the liftoff layer remaining between the hard-mask layer and the substrate; and after the step of furnishing the substrate and prior to the step of depositing the deposited material, removing a lateral portion of the substrate.

12. A method for fabricating a feature including the deposition of a deposited material, comprising the steps of furnishing a substrate comprising a part of a magnetic read/write head; thereafter depositing a liftoff layer overlying the substrate; thereafter depositing a hard-mask layer overlying the liftoff layer; thereafter depositing an image layer of a photoresist material in registry with a retained portion of the hard-mask layer, leaving a nonretained portion of the hardmask layer which is not in registry with the image layer; thereafter removing the nonretained portion of the hard-mask layer by a process that does not remove the image layer;

removing the image layer;

removing a nonretained portion of the liftoff layer including a portion of the liftoff layer that does not lie in registry with the retained portion of the hard-mask layer, and an undercut portion of the liftoff layer that lies in registry with the retained portion of the hard-mask layer; thereafter depositing the deposited material onto the substrate from a source that produces a beam of the deposited material; and thereafter removing the retained portion of the hard-mask layer and any part of the liftoff layer remaining between the hard-mask layer and the substrate.

13. The method of claim 12, wherein the step of furnishing a substrate includes the step of providing a part of a magnetoresistance sensor structure.

14. The method of claim 13, including an additional step, after the step of furnishing the substrate and prior to the step of depositing the deposited material, of removing a lateral portion of the part of the magnetoresistance sensor structure.

15. The method of claim 12, wherein the step of removing the retained portion of the hard-mask layer includes the step of dissolving the liftoff layer remaining between the hard-mask layer and the substrate.

16. A method for fabricating a feature including the deposition of a deposited material, comprising the steps of furnishing a substrate comprising a magnetoresistance sensor structure having a sensing area; thereafter depositing a liftoff layer of an organic liftoff layer material overlying the magnetoresistance sensor structure; thereafter depositing a hard-mask layer of a nonorganic hard mask material overlying the magnetoresistance sensor structure; thereafter depositing by photolithography an image layer of an organic photoresist material in registry with the sensing area and overlying the sensing area; thereafter reactive ion etching in a fluorine-containing atmosphere to remove that portion of the hard-mask layer which is not overlaid by the image layer;

reactive ion etching in an oxygen-containing atmosphere to remove the image layer;

undercutting the hard-mask layer by removing some of the liftoff layer that underlies the hard-mask layer;

depositing the deposited material onto the substrate from a source that produces a beam of the deposited material, the thickness of the hard-mask layer being sufficient that it is not removed during the step of depositing the deposited material; and thereafter dissolving the remaining organic liftoff layer material.

17. The method of claim 16, wherein the step of depositing by photolithographic the image layer includes the steps of depositing a layer of an image layer organic photoresist material overlying the entire hard-mask layer, and patterning and developing the layer of the image layer organic photoresist material.

18. The method of claim 16, wherein the step of depositing the hardmask layer of the nonorganic hard mask material includes the step of depositing a hard-mask layer of a material selected from the group consisting of tantalum, tantalum oxide, silicon nitride, and silicon dioxide.

19. The method of claim 16, wherein the step of depositing the hardmask layer of the nonorganic hard mask material includes the step of depositing the hard-mask layer in a thickness of from about 50 nm to about 150 nm.

20. The method of claim 16, including an additional step, after the step of furnishing the substrate and prior to the step of depositing the deposited material, of removing a portion of the magnetoresistance sensor structure spaced laterally from the sensing area.

* * * * *